US010742743B2

(12) United States Patent
Gattu et al.

(10) Patent No.: US 10,742,743 B2
(45) Date of Patent: Aug. 11, 2020

(54) SYSTEMS AND METHODS FOR MANAGING IOT/EOT DEVICES

(71) Applicant: BlackBerry Limited, Waterloo (CA)

(72) Inventors: Balasubrahmanyam Gattu, San Ramon, CA (US); Bryan Nelson Grunow, Raleigh, NC (US); Tyler Coffin, Guelph (CA); Michael John Higgs, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 120 days.

(21) Appl. No.: 16/195,146

(22) Filed: Nov. 19, 2018

(65) Prior Publication Data

US 2020/0162557 A1 May 21, 2020

(51) Int. Cl.
*G06F 15/173* (2006.01)
*H04L 29/08* (2006.01)
*H04L 12/24* (2006.01)

(52) U.S. Cl.
CPC ........ *H04L 67/125* (2013.01); *H04L 41/0893* (2013.01)

(58) Field of Classification Search
CPC ............... H04L 67/125; H04L 41/0893; H04L 41/0806; H04L 41/0869; H04L 63/101; G06F 9/44505
USPC .................................................. 709/221, 223
See application file for complete search history.

(56) References Cited

U.S. PATENT DOCUMENTS

| 8,185,088 B2 | 5/2012 | Klein et al. |
| 9,143,530 B2 | 9/2015 | Qureshi et al. |
| 10,321,303 B1 * | 6/2019 | Namiranian .......... H04W 40/04 |
| 2002/0144002 A1 * | 10/2002 | Matena .................... G06F 9/468 719/310 |
| 2003/0163726 A1 * | 8/2003 | Kidd .................... H04N 21/835 726/6 |

(Continued)

FOREIGN PATENT DOCUMENTS

| EP | 3176703 A1 | 6/2017 |
| WO | 2006014504 A2 | 2/2006 |

OTHER PUBLICATIONS

EPO, Extended European Search Report relating to application No. 19205922.8 dated Mar. 20, 2020.

*Primary Examiner* — Brian Whipple
*Assistant Examiner* — Hannah S Wang
(74) *Attorney, Agent, or Firm* — Rowand LLP

(57) ABSTRACT

A method for managing enrollments of an IoT device is disclosed. The method includes: transmitting a request to enroll the device with a first device management service; receiving, from a server associated with the first device management service, a first policy profile including one or more first device management policies, the first policy profile defining at least one restriction on management of the device by other device management services with which the device enrolls; transmitting a request to enroll the device with a second device management service; receiving, from a server associated with the second device management service, a second policy profile including one or more second device management policies; identifying a subset of the one or more second device management policies which comply with the at least one restriction; and applying the identified subset of the one or more second device management policies on the device.

15 Claims, 5 Drawing Sheets

(56) References Cited

U.S. PATENT DOCUMENTS

| | | |
|---|---|---|
| 2005/0108057 A1 | 5/2005 | Cohen et al. |
| 2008/0256593 A1 | 10/2008 | Vinberg et al. |
| 2010/0146595 A1* | 6/2010 | Sheymov .............. H04L 63/101 |
| | | 726/4 |
| 2011/0296414 A1* | 12/2011 | Hinojosa ................ G06F 9/468 |
| | | 718/100 |
| 2013/0007245 A1 | 1/2013 | Malik et al. |
| 2014/0113593 A1 | 4/2014 | Zhou et al. |
| 2016/0094386 A1* | 3/2016 | Kaufman ............ H04L 41/0806 |
| | | 709/220 |
| 2017/0126470 A1* | 5/2017 | Bernat .................. G06F 3/0604 |
| 2018/0109430 A1* | 4/2018 | Quintas ............... H04L 63/0823 |
| 2018/0131751 A1* | 5/2018 | Jones ...................... H04L 67/10 |
| 2018/0139090 A1 | 5/2018 | Geiger et al. |
| 2018/0145877 A1* | 5/2018 | Ramesh .................. H04L 67/34 |
| 2018/0285232 A1* | 10/2018 | Minegishi ........... G06F 11/3433 |
| 2018/0322109 A1* | 11/2018 | Woods .................. G06F 40/186 |
| 2019/0080360 A1* | 3/2019 | Pan .................... G06Q 30/0277 |
| 2019/0114203 A1* | 4/2019 | James .................. H04L 41/042 |
| 2019/0149405 A1* | 5/2019 | Verma .................. H04L 67/303 |
| | | 709/222 |
| 2019/0222475 A1* | 7/2019 | Andrews .............. H04L 41/085 |
| 2019/0245928 A1* | 8/2019 | Joy ....................... H04L 67/125 |
| 2019/0327271 A1* | 10/2019 | Saxena ................ G06N 3/0454 |
| 2019/0327315 A1* | 10/2019 | Grooters .................. G06F 8/60 |
| 2020/0028960 A1* | 1/2020 | Verma .................. H04L 63/108 |
| 2020/0128046 A1* | 4/2020 | Schaefer ................ H04L 63/20 |

\* cited by examiner

SYSTEMS AND METHODS FOR MANAGING IOT/EOT DEVICES

TECHNICAL FIELD

The present disclosure relates to device management and, in particular, to systems and methods for remotely managing Internet-connected devices.

BACKGROUND

Device management services facilitate administration of user devices. Organizations that deploy devices to multiple users will typically implement a device management service to track, monitor, and control use of the devices. In particular, a device management service enables central remote management of user devices. Some of the basic functions of device management services include securing device and enterprise data, creating and deploying IT policies, and remotely configuring devices.

In a typical implementation of a device management service, user devices are registered, or enrolled, and configured to communicate with a control server associated with the device management service. An administrator of the control server can then send commands and other data, such as security policies, configuration settings, and software updates, to the enrolled devices.

The rapid growth of the Internet-of-Things (IoT) poses new challenges for device management. Traditional models of device management are not readily extendible to systems for managing IoT devices, which may vary in type, function, ecosystem or platform, and managing entity. In particular, variations in device hardware and differences in the software running on them make it difficult to impose a consistent management scheme for IoT devices.

Thus, it would be advantageous to provide systems and methods for effective management of IoT devices.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
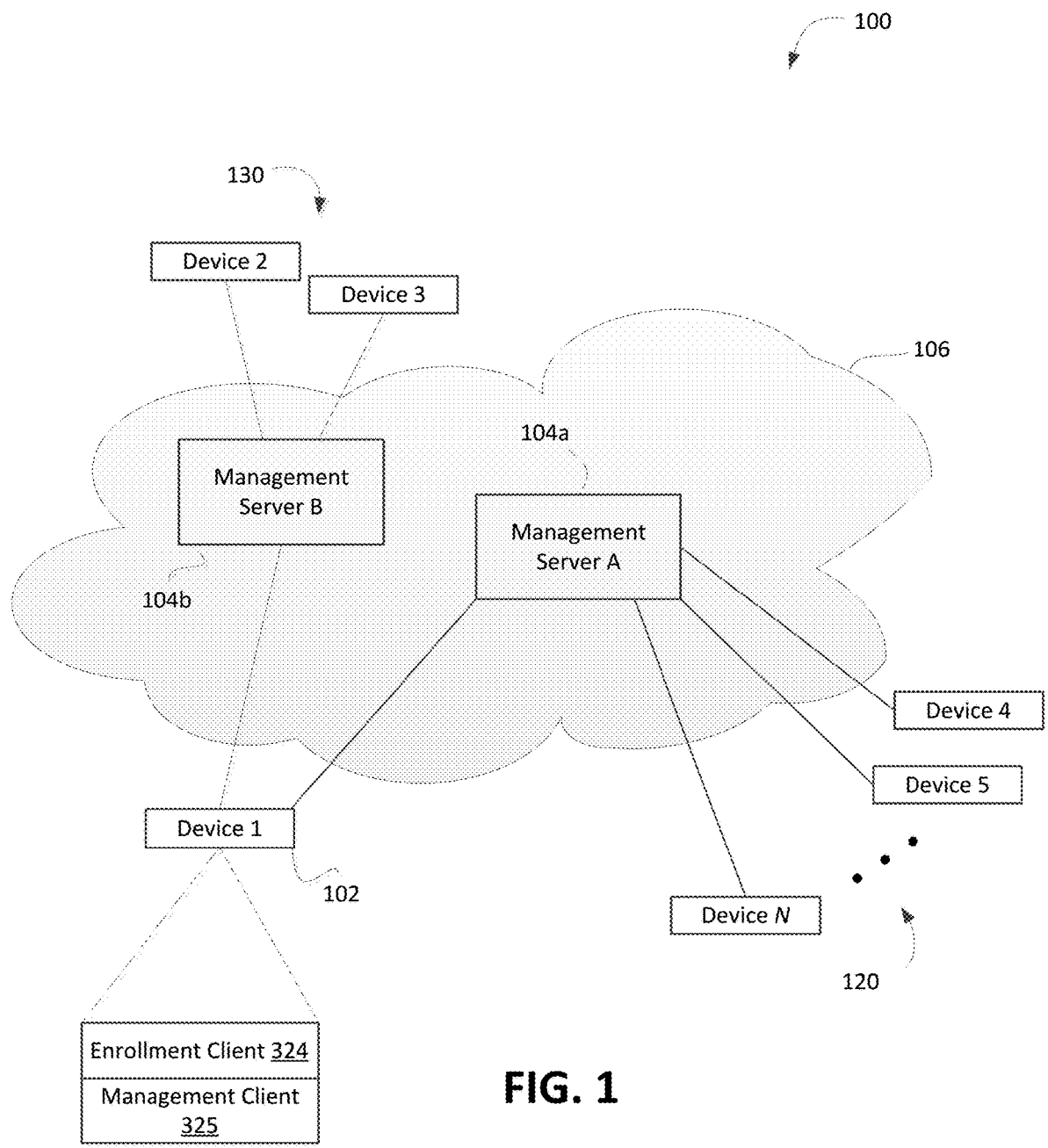
FIG. 1 is a schematic diagram illustrating an exemplary operating environment for managing one or more Internet-connected devices.

In one aspect, the present disclosure describes a method for enrolling an Internet-connected device with multiple device management services. The method includes: transmitting, to a server associated with a first device management service, a request to enroll the device with the first device management service; receiving, from the server associated with the first device management service, a first policy profile including one or more first device management policies, the first policy profile defining at least one restriction on management of the device by other device management services with which the device enrolls; transmitting, to a server associated with a second device management service, a request to enroll the device with the second device management service; receiving, from the server associated with the second device management service, a second policy profile including one or more second device management policies; identifying a subset of the one or more second device management policies which comply with the at least one restriction; and applying the identified subset of the one or more second device management policies on the device.

In another aspect, the present disclosure describes an Internet-connected device. The device includes memory and a processor coupled to the memory. The processor is configured to: transmit, to a server associated with a first device management service, a request to enroll the device with the first device management service; receive, from the server associated with the first device management service, a first policy profile including one or more first device management policies, the first policy profile defining at least one restriction on management of the device by other device management services with which the device enrolls; transmit, to a server associated with a second device management service, a request to enroll the device with the second device management service; receive, from the server associated with the second device management service, a second policy profile including one or more second device management policies; identify a subset of the one or more second device management policies which comply with the at least one restriction; and apply the identified subset of the one or more second device management policies on the device.

Other example embodiments of the present disclosure will be apparent to those of ordinary skill in the art from a review of the following detailed descriptions in conjunction with the drawings.

In the present application, the term "and/or" is intended to cover all possible combination and sub-combinations of the listed elements, including any one of the listed elements alone, any sub-combination, or all of the elements, and without necessarily including additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "enrollment" is intended to refer to an instance of a device enrollment with a device management service. When a device is enrolled with a device management service, the device is configured to communicate with a control server associated with the device management service. The term "enrollment" may additionally refer more broadly to administration of a device by a device management service.

Traditional device management solutions are not adequately equipped for administration of IoT devices. The classic model of a management server administering a plurality of subscriber devices that are of a singular type is not effective in dealing with the inherent diversity of IoT devices. In particular, the variations in hardware and differences in the software running on them make it difficult to implement a system that manages IoT devices in a consistent and predictable manner.

The present disclosure describes techniques for managing Internet-connected devices. More specifically, a multi-tier enrollment mechanism for connected devices is described. According to embodiments of the present disclosure, a device enrolls with multiple device management services. The enrollments of a device with different device management services are conceptualized in a hierarchical manner, with the levels of the hierarchy being associated with degrees of control which may be exercised over the device by the device management services.

A "root" enrollment represents the initial enrollment of a device with a first device management service, and subsequent enrollments of the device with other device management services may be considered to be "child", "grandchild", etc. enrollments of the "root". The "root" enrollment sets the initial device management policies/controls for the enrolled device. Upon completion of the "root" enrollment, an administrator of the first device management service can issue commands and other data, such as security policies, configuration data, etc., to the device. For example, the policies set by the "root" enrollment may involve configuring device security settings, providing software updates, defining basic connectivity profiles, and enabling or disabling certain device functionalities.

An enrollment with a particular device management service delimits the scope of control that can be exercised by other device management services that are "lower" in the hierarchy of enrollments. A device management service with which a device enrolls can set the policies that determine the scope of allowable control associated with subsequent enrollments of the device with other management services. In other words, the policies that are issued or set by a "child" enrollment may only enable configurations of an enrolled device that are within the ambit of allowable control set by a "parent" enrollment.

For example, a first device management service that is associated with a first enrollment of a device may indicate features or settings of the enrolled device that cannot be configured by any device management service associated with a subsequent enrollment. The first device management service may, for example, establish policies that define the types of features and/or settings of the device that subsequent (i.e. "child", "grandchild", etc.) enrollments are permitted to manage.

A multi-tier enrollment model can offer flexibility for managing IoT devices. By enrolling a device with multiple independent device management services, it is possible to manage IoT devices according to suitable "groupings" of the devices, while preserving a hierarchy of limits on management of the device by various different entities (i.e. device manufacturer, owner, and users). A particular enrollment of the device sets restrictions on allowable control by other enrollments that are lower in the hierarchy of enrollments.

The highest level (i.e. "root") in the enrollment hierarchy can correspond to a device manufacturer. The device manufacturer enrolls a device with a first management service. A "child" of the "root" enrollment may correspond to an enrollment by a device owner, who purchases the device from the device manufacturer. The device owner may enroll the device with a second management service. The second management service is independent of the first management service. The second device management service may, for example, be configured to manage one or more devices that are owned by the device owner. In particular, IoT devices that are owned by this device owner may be "grouped" together and collectively managed by the second device management service. The second device management service becomes the *nexus* of control for this grouping (i.e. IoT devices that are commonly owned by the owner) of devices.

A "grandchild" of the "root" enrollment (or the "child" enrollment of the device owner) may correspond an enrollment by a user of the device. The user may enroll the device with a third device management service that is independent of the first and second device management services. The IoT devices that are used by this user may be grouped together and collectively managed by the third device management service. That is, the third device management service becomes the nexus of control for the grouping of devices that are used by the user.

This technique of identifying suitable groupings of IoT devices and assigning different device management services to manage the devices of the identified groups provides a solution for device management that is flexible for dealing with the inherent diversity of features of IoT devices. This technique also preserves the hierarchy of limits on control that is exercisable by parties that are associated with a device (i.e. manufacturer, owner, users). The parties may have different expectations concerning the types of restrictions that should be applied to a device, and the hierarchical enrollment scheme facilitates independent and restricted expression of control by the device management services corresponding to different levels of the enrollment hierarchy.

Reference is made to FIG. 1, which shows an exemplary operating environment 100 in accordance with embodiments of the present disclosure. The environment 100 includes at least a first device 102. The first device 102 is an Internet-connected device. In particular, the first device 102 may be a physical device, vehicle, appliance, or another object that is configured for connecting to the Internet. For example, the first device 102 may be an electronic device, such as a smartphone, a tablet, a laptop computer, a personal digital assistant, a portable navigation device, a wearable device, or any other type of computing device that may be configured to store data and software instructions. As further examples, the first device 102 may be a connected vehicle, a smart home appliance, a health monitoring device, a medical device, or manufacturing equipment. More generally, the first device 102 may be an IoT device. That is, the first device 102 may be a physical object that has been configured to connect to and exchange data via the Internet. An otherwise non-connected physical object may be modified by embedding the object with electronics, software, sensors, actuators, etc. in order to enable Internet connectivity.

The environment 100 includes a first management server 104a. The first management server 104a is associated with a first device management service. In particular, the first management server 104a may be a control server for the first device management service. The first management server 104a implements one or more device management protocols. For example, the first management server 104a is configured to send commands and other data, such as software updates, compliance policies, etc., to managed devices. In some embodiments, the first management server 104a may also be associated with a second device management service. That is, two or more device management services may be administered at the same management server. Alternatively, the environment 100 may include a further second management server 104b, which is associated with the second device management service. The first management server 104a and the second management server 104*b* may be independently controlled. For example, the first management server 104*a* may be controlled by a first entity that is different from and independent of a second entity which manages the second management server 104*b*.

The first device 102 is in wireless communication with at least the first management server 104*a*. In the embodiment illustrated in FIG. 1, the first device 102 is also in wireless communication with the second management server 104*b*. The environment 100 also includes a plurality of second devices 120 that are in wireless communication with the first management server 104*a*, and a plurality of third devices 130 that are in wireless communication with the second management server 104*b*. The first management server 104*a* is configured to administer at least one of the first device 102 and second devices 120, and the second management server 104*b* is configured to administer at least one of the first device 102 and the third devices 130. The devices 102, 120 and 130 may be IoT devices. In particular, each device in the environment 100 may include a communication subsystem that is configured for data communication with one or more of the management servers 104*a* and 104*b*.

The network 106 is a computer network. The network 106 allows computer systems in communication therewith to communicate. For example, as illustrated, the network 106 may allow the first device 102 and the second devices 120 to communicate with the first management server 104*a* and the first device 102 and the third devices 130 to communicate with the second management server 104*b*.

The devices in the environment 100 are configured to execute instructions for enrolling with one or more device management services. As shown in FIG. 1, the first device 102 includes an enrollment client 324. The enrollment client 324 may, for example, be a web application (e.g. single-page application, or SPA), a mobile application, or a desktop application. In some embodiments, the enrollment client 324 may be implemented as a component or feature of another application, such as a mobile device management app. The enrollment client 324 may be an app that can be used to enroll and configure the first device 102 to communicate with one or more of the management server 104*a* and 104*b*.

The first device 102 also includes a management client 325. The management client 325 may, for example, be a stand-alone web/mobile/desktop application, or it may be implemented as a component or feature of another application. The management client 325 may be used to request synchronization of the first device 102 with a management server. For example, the management client 325 may be configured to check for available updates at a device management server, receive commands or policies set by an administrator of the device management service, and apply the received commands/policies on the first device 102. One or both of the enrollment client 324 and the management client 325 may be implemented as part of software or firmware for the first device 102. For example, the enrollment client 324 and the management client 325 may be installed on the first device 102 at the time of its manufacture, or downloaded from a third-party server for installing on the first device 102.

In some embodiments, the enrollment client 324 and the management client 325 may be components of an agent application that is installed on the first device 102. The agent application may function as the client-side focal point for communications between the first device 102 and the desired management server. For example, the agent application may be configured to examine a state of the first device 102, such as the device's current location, functionalities, security settings, and software version, and report findings to a management server. The agent application can then receive commands and/or device management data (e.g. configuration settings, software updates, device security policies) from the management server, and make may adjustments to the first device's behavior or state to comply with the policies set by the device management service.

Figure 2A:
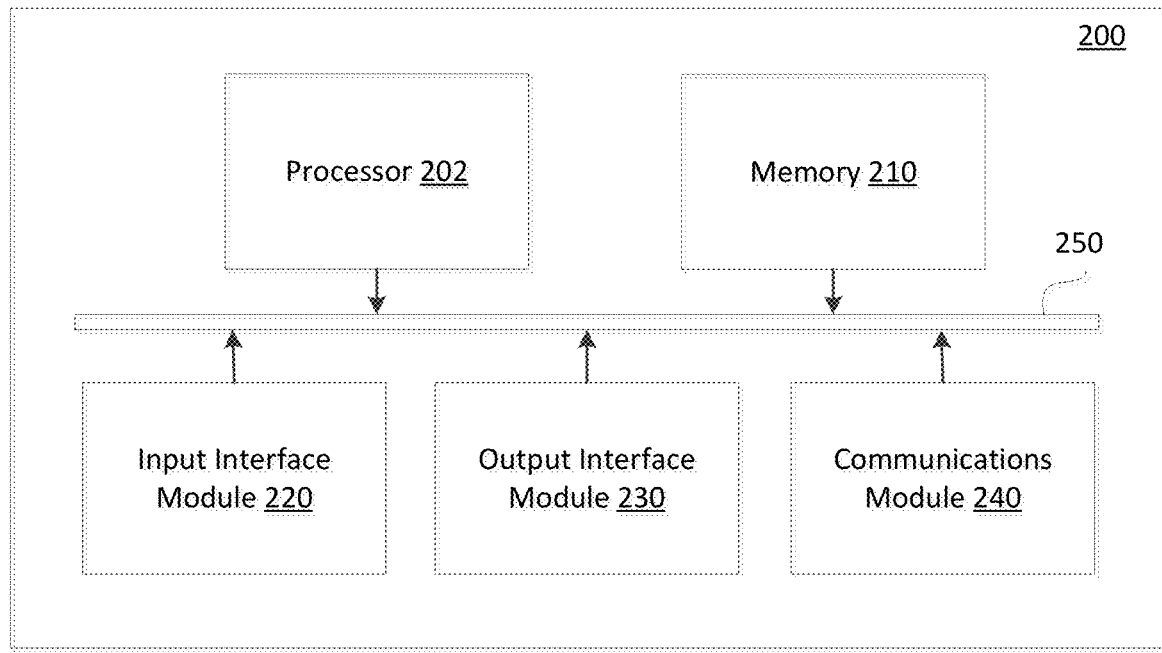
FIG. 2A is a high-level operation diagram of an example computing system for implementing example embodiments of an access control system.

FIG. 2A is a high-level operation diagram of an example computing system 200 that may be configured as a device management control server. The computing system 200 includes a plurality of modules. For example, the computing system 200 may include a processor 202, a memory 210, an input interface module 220, an output interface module 230, and a communications module 240. As illustrated, the foregoing example modules of the computing system 200 are in communication over a bus 250.

The processor 202 is a hardware processor. Processor 202 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the computing system 200.

The input interface module 220 allows the computing system 200 to receive input signals. Input signals may, for example, correspond to input received from a user. The input interface module 220 may serve to interconnect the computing system 200 with one or more input devices. The output interface module 230 allows the computing system 200 to provide output signals. Some output signals may, for example allow provision of output to a user. The output interface module 230 may serve to interconnect the computing system 200 with one or more output devices. Output signals may be sent to output devices by output interface module 230.

The communications module 240 allows the computing system 200 to communicate with other devices and/or various communications networks. For example, the communications module 240 may allow the computing system 200 to send or receive communications signals. Communications signals may be sent or received according to one or more protocols or standards. For example, the communications module 240 may allow the computing system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the computing system 200 to communicate using near-field communication (NFC), via Wi-Fi™, using Bluetooth™ or via some combination of one or more networks or protocols.

Software comprising instructions is executed by the processor 202 from a computer-readable medium. For example, software may be loaded into random-access memory from persistent storage of memory 210. Additionally or alternatively, instructions may be executed by the processor 202 directly from read-only memory of memory 210.

Figure 2B:
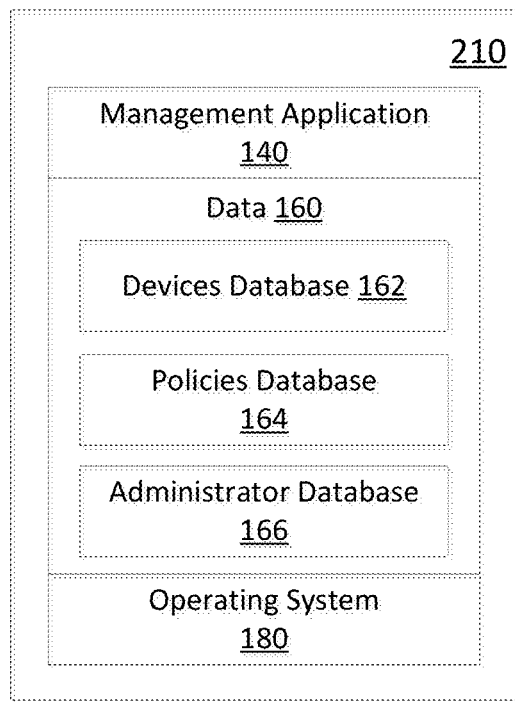
FIG. 2B depicts a simplified software organization of the example computing system of FIG. 2A.

FIG. 2B depicts a simplified organization of the components of an exemplary memory 210 of the computing system 200. As illustrated, the memory 210 includes a server-side device management application 140, data 160 including, at least, a devices database 162, a policies database 164, and an administrator database 166, and an operating system 180. In some embodiments, two or more of the databases 162, 164 and 166 may be jointly implemented in a single data store. For example, the data in the devices database 162 and policies database 164 may be stored in a single database.

The server-side device management application 140 may be used by an administrator to control one or more managed devices. The management application 140 may, for example, provide an interface (e.g. console) for an administrator to use in managing devices. For example, the management application 140 may be used to select commands, policies, settings, etc. for distribution to managed devices. As a further example, the management application 140 may be used for remotely configuring managed devices. More generally, the management application 140 enables an administrator to perform various server-side tasks relating to, for example, data collection and analysis, distribution of device management policies, remote configuration of managed devices, and compliance audit and reporting.

The operating system 180 is software. The operating system 180 may, for example, be Apple iOS™, Google™ Android™, Linux™, Microsoft™ Windows™, or the like.

The devices database 162 comprises a repository of device information for devices that have been managed or are currently being managed by, or enrolled with, one or more device management services associated with the management server/system 200. The devices database 162 may store, for one or more managed devices, device data indicating at least a device identifier, a device type, manufacturer, owner, and/or user identifiers, operating system or platform, and time and duration of device management. The devices database 162 may be updated manually as entries for newly enrolled devices are added or as entries for unenrolled devices are deleted. Alternatively, the devices database 162 may be updated automatically when a device is enrolled or unenrolled.

The policies database 164 may include definitions of policies, rules, and settings that one or more device management services creates and deploys to enrolled devices. A wide range of different policies may be provided. The policies database 164 may include, for example, security policies, device customization settings, connectivity profiles, software updates, device management constraints for subsequent enrollments, remote device configuration/control settings, access control policies, and network configuration settings. In some embodiments, the policies database 164 may be integrated with the devices database 162. In particular, the data from the policies database 164 and the devices database 162 may be combined. For example, the data from these databases may indicate mappings of policies to different enrolled devices. The mappings may, for example, identify policies that have: already been applied by one or more enrolled devices; previously deployed to, but not yet applied by, one or more enrolled devices; or pending deployment. The policies database 164 may be updated when the administrators of the device management services provide definitions of policies, rules, etc. for deploying to their enrolled devices.

The administrator database 166 may store data identifying the administrators, or managing entities, of a device management service associated with the management server. In particular, the administrator database 166 may contain authentication data for verifying the identities of administrators that are authorize to manage one or more devices via the management server. The server restricts management privileges of administrators so that an administrator is only able to conduct those management tasks for which it has express authority.

Figure 3:
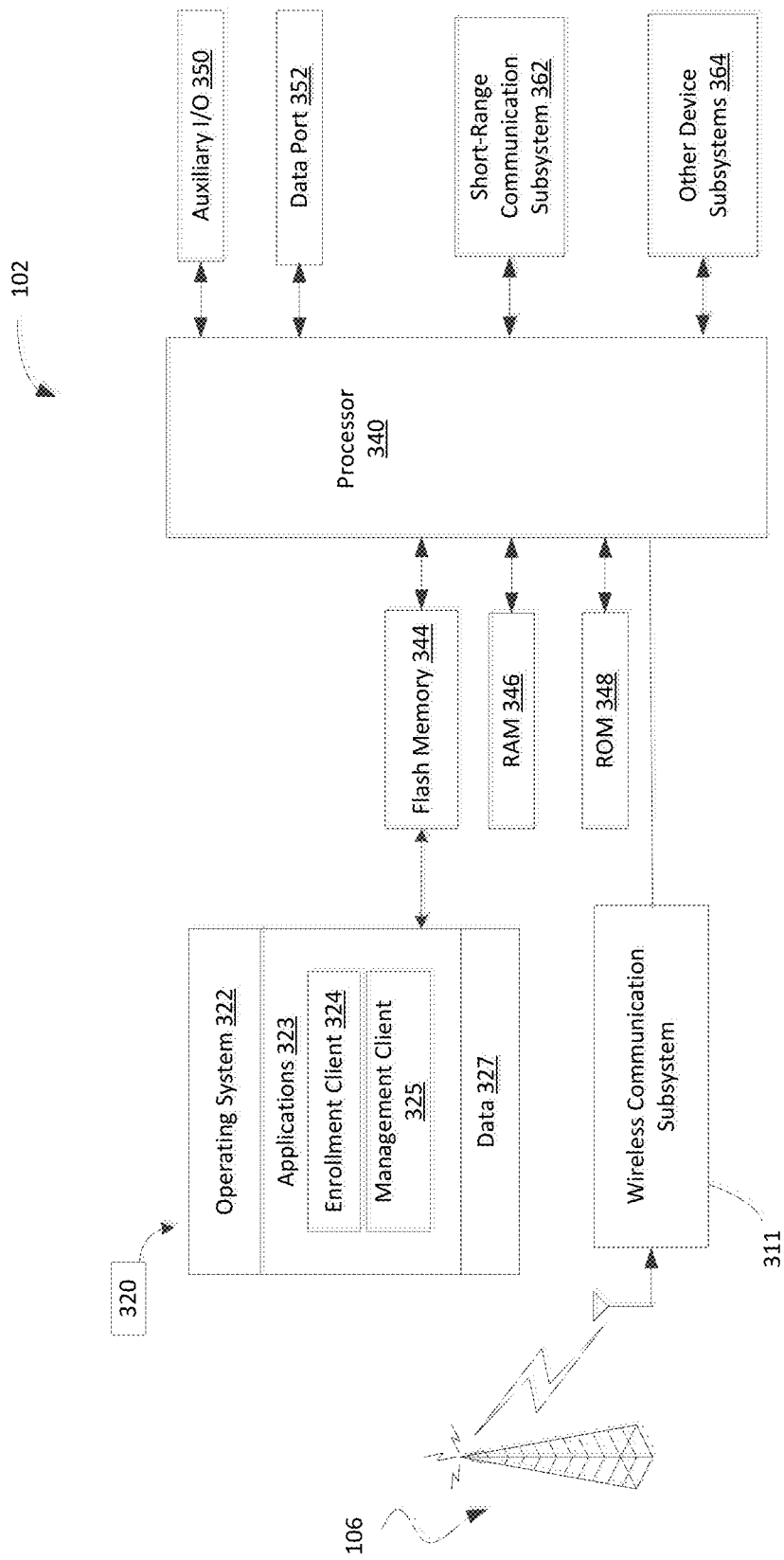
FIG. 3 is a block diagram illustrating an example Internet-connected device.

Reference is now made to FIG. 3, which illustrates an example first device 102. The first device 102 may be any IoT device that is configured for network connectivity. More specifically, the first device 102 may be any object that is equipped with electronics, sensors, actuators, etc. that enable the object to connect, collect, and exchange data via a computer network, such as the Internet.

The first device 102 includes a controller. The controller includes at least one processor 340 (such as a microprocessor) which controls the overall operation of the first device 102. The processor 340 interacts with device subsystems such as a wireless communication subsystem 311 for exchanging radio frequency signals with a wireless network (such as network 106) to perform communication functions. The processor 340 interacts with additional device subsystems, including flash memory 344, random access memory (RAM) 346, read only memory (ROM) 348, auxiliary input/output (I/O) subsystems 350, a short-range communication subsystem 362, and other device subsystems (generally designated as 364). Some of the subsystems shown in FIG. 3 perform communication-related functions, whereas other subsystems may provide "resident" or on-device functions.

The particular design of the wireless communication subsystem 311 depends on the wireless network 106 in which the first device 102 is intended to operate. The wireless network 106 may include a wireless wide area network (WWAN) or a wireless local area network (WLAN).

The first device 102 may store data 327 in an erasable persistent memory, which in one example embodiment is the flash memory 344. In various example embodiments, the data 327 may include service data having information required by the first device 102 to establish and maintain communication with the wireless network 106. The data 327 may also include user application data such as email messages, address book and contact information, calendar and schedule information, notepad documents, image files, and other commonly stored user information stored on the first device 102 by its user, and other data. The data 327 stored in the persistent memory (e.g. flash memory 344) of the first device 102 may be organized, at least partially, into a number of databases or data stores each containing data items of the same data type or associated with the same application. For example, email messages, contact records, and task items may be stored in individual databases within the first device 102 memory.

The short-range communication subsystem 362 is an additional optional component which provides for communication between the first device 102 and different systems or devices, which need not necessarily be similar devices. For example, the short-range communication subsystem 362 may include an infrared device and associated circuits and components, or a wireless bus protocol compliant communication mechanism such as a Bluetooth® communication module to provide for communication with similarly-enabled systems and devices.

A pre-determined set of applications that control basic device operations, including data and possibly voice communication applications may be installed on the first device 102 during or after manufacture. Additional applications and/or upgrades to an operating system 322 or software applications 323 may also be loaded onto the electronic device 102 through the wireless network 101, the auxiliary I/O subsystem 350, the data port 352, the short-range communication subsystem 362, or other suitable device subsystems 364. The downloaded programs or code modules may be permanently installed, for example, written into the program memory (e.g. the flash memory 344), or written into and executed from the RAM 346 for execution by the processor 340 at runtime.

The processor 340 operates under stored program control and executes software modules 320 stored in memory such as persistent memory; for example, in the flash memory 344. As illustrated in FIG. 3, the software modules 320 may include operating system software 322 and one or more additional applications 323.

Figure 4:
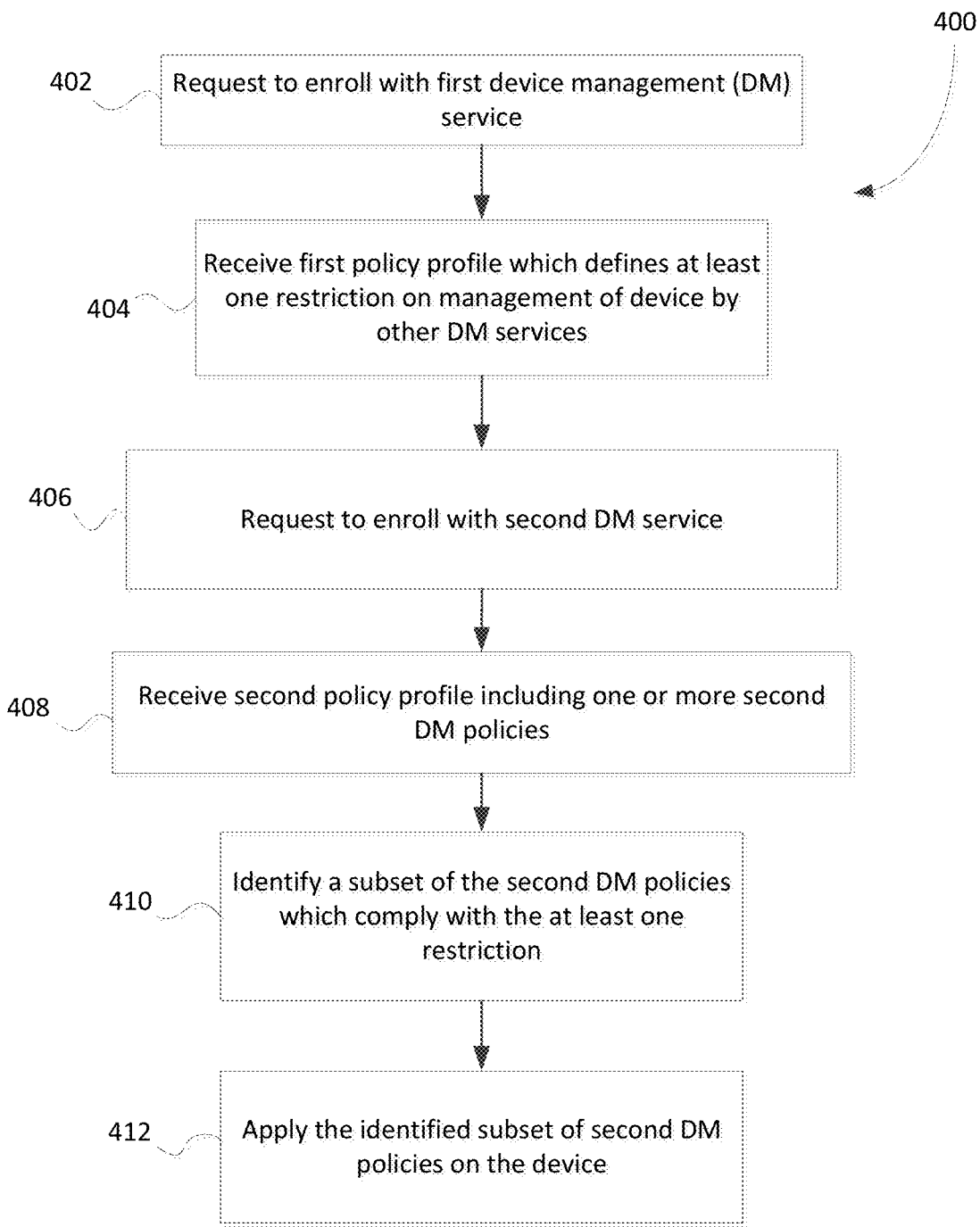
FIG. 4 shows, in flowchart form, an example method for managing enrollments of an Internet-connected device with device management services.

Reference is made to FIG. 4, which shows, in flowchart form, an example method 400 for managing enrollments of an IoT device with multiple device management services. The method 400 may be performed by an IoT client device, such as first device 102 of FIG. 1, which is configured to connect to at least one device management server. The IoT client device may include an enrollment management module, such as enrollment client 324 of FIG. 1. An IoT client device may perform method 400 to register with two or more device management services.

In operation 402, the client device requests to enroll with a first device management service (hereinafter, the "first enrollment"). The client device transmits, to a server associated with the first device management service, a request to enroll with the first device management service. The first device management service may, for example, be associated with a manufacturer of the client device. That is, the device manufacturer may use the first device management service for administration (e.g. configuration, remote activation or deactivation, etc.) of the client device. In this way, a single management point can be designated for managing equipment and devices of a manufacturer (e.g. at a local factory or warehouse of the manufacturer).

By enrolling with the first device management service, the client device is configured to communicate with a control server associated with the first device management service. As an initial step of the enrollment process, the client device may generate a request or query to a discovery web service to obtain any configuration information necessary for enrollment. In the discovery response, the client device may receive information identifying a location of an available enrollment endpoint associated with the first device management service (e.g. enrollment URL). The client device may also receive an authentication policy which indicates what type of user authentication is required for enrollment. Only those devices that are authorized to enroll with the first device management service may be managed by the control server.

In some embodiments, the client device may select the first device management service from a set of one or more different device management services. For example, an enrollment client application on the device may be configured to access a list of available device management services and select one of the services. After obtaining any required information for enrollment (e.g. authentication URL, enrollment URL), the client device connects to the control server associated with the first device management service.

Once the client device is authenticated with the enrollment service, the control server may provide configurations needed to provision the client device. After the client device has been successfully enrolled, the client device receives, from the control server associated with the first device management service, a first policy profile, in operation 404. The first policy profile includes one or more first device management policies. For example, the first policy profile may include commands, such as security policies, device configuration settings, etc., that are created and deployed by the first device management service. These commands may, for example, be set by an administrator of the first device management service.

The first policy profile defines at least one restriction on management of the client device by other device management services with which the device enrolls. In particular, one or more of the first device management policies specify restrictions on the scope of management activities that are permitted by device management services that the client device subsequently enrolls with. For example, the first device management service may set limits on the features and/or settings of the client device that can be controlled in subsequent enrollments. That is, the at least one restriction may indicate one or more features of the client device which are not manageable via other device management services. In effect, such restriction may disable the use of one or more features of the client device for administrators of subsequent enrollments, such as, for example, distributors and users of the client device. Accordingly, any subsequent enrollment would only be capable of managing one or more of the remaining features of the client device.

As another example, the first device management policies may include compliance rules for the client device, such as required configurations of device security settings. For example, the compliance rules may specify minimum requirements of a device password that a user of the client device must maintain. The at least one restriction imposed by the first device management policies may indicate one or more rules, in addition to the compliance rules, that are required to be enforced by subsequent enrollments of the client device. For example, if a policy is assigned for the client device password to be at least 4 characters long, any subsequent enrollment of the client device may only assign password policies that require the password length to be strictly greater than 4 characters. More generally, the at least one restriction may indicate a rule or requirement to be implemented for a subsequent enrollment that is narrower than a corresponding rule/requirement for the first enrollment. A rule or requirement for a subsequent enrollment may, for example, be a rule/requirement for the first enrollment that is modified to include additional limitations.

As yet another example, the at least one restriction may set a limit on duration of device control by subsequent enrollments of the client device. That is, the policies deployed by the first device management service may specify a time limit on administration of the client device by one or more of the subsequent enrollments. For example, the at least one restriction may indicate a maximum allowable duration of management by a second enrollment (e.g. administration of the client device by a retailer or a device user) that immediately succeeds the first enrollment. After this maximum duration, the client device may, for example, be automatically unenrolled from the second enrollment.

It should be noted that a restriction that specifies limits on management of the client device by other device management services may apply to more than one device management service. In particular, a restriction that is set out in the first policy profile may be imposed on management of the client device by each of one or more device management services with which the client device subsequently enrolls. For example, the first device management policies may set a maximum allowable duration of management by any enrollment which succeeds the first enrollment. That is, any device management service with which the client device enrolls after the first enrollment may be prohibited from managing the client device for a period of time that is greater than the maximum allowable duration.

It is useful to conceptualize the set of enrollments of the client device with multiple different device management services as a hierarchy. The first enrollment represents a "root" of the hierarchy. Each subsequent enrollment of the client device with other device management services can then be treated as a "child", "grandchild", etc. enrollment of the first enrollment. More specifically, an enrollment of the client device is a "parent" of another enrollment which immediately succeeds it.

In the context of this hierarchy of enrollments, the restrictions that are set out by the policies of a device management service apply to all its "child" enrollments. That is, the policies of a device management service may impose restrictions on management of the client device by any subsequent enrollment. Thus, a device management service may only be able to control those settings and/or configurations of the client device which are permitted by enrollments that are at higher levels in the hierarchy. In particular, a device management service is constrained by the restrictions on management of the client device which are imposed by policies of all of the preceding enrollments.

In operation 406, the client device requests to enroll with a second device management service. The client device transmits, to a server associated with the second device management service, a request to enroll with the second device management service. The second device management service may, for example, be associated with a first user of the client device. That is, a first user may use the second device management service for administration of the client device. In particular, the second device management service may be used for administering a plurality of devices that are owned by and/or managed by the first user. For example, the first user may manage one or more devices by deploying various policies, via the second device management service, for customizing those devices. The first user may also be able to automate workflows for a plurality of IoT devices by using a common device management service for managing those devices.

By enrolling with the second device management service, the client device is configured to communicate with a control server associated with the second device management service. In some embodiments, the first device management service and the second device management service may be implemented at the same control server. That is, a single control (management) server may administer both the first device management service and the second device management service. For example, each of the first device management service and the second device management service may have a unique enrollment endpoint for connecting to the control server. Alternatively, the first device management service and the second device management service may be implemented at two different control servers.

In at least some embodiments, the client device may install at least one enrollment client application for managing enrollment of the client device with one or both of the first device management service and the second device management service. The at least one enrollment client application may serve as an agent software for enabling a multi-part enrollment of the client device. In some cases, two separate client applications may be installed on the client device for handling enrollment tasks. That is, the client device may include a first enrollment client application for managing enrollment of the client device with the first device management service and a second enrollment client application for managing enrollment of the client device with the second device management service. The enrollment client application may be implemented as part of software or firmware for the client device. For example, an enrollment client may be installed on the client device at the time of its manufacture, or downloaded from a third-party server for installing on the client device.

In operation 408, the client device receives, from a server associated with the second device management service, a second policy profile including one or more second device management policies. The second device management policies may include various information technology (IT) policies (e.g. security policies, configuration settings, etc.) issued by an administrator of the second device management service. The client device may request for the second device management policies to be deployed to the client device, or the second device management policies may be issued automatically. For example, the second device management policies may be issued to client devices on a periodic basis or upon initial enrollment by a client device.

The client device then identifies a subset of the received second device management policies which comply with the at least one restriction on management of the client device that was imposed by the first policy profile, in operation 410. For example, the policies of the subset may relate to control of features or settings that are not expressly prohibited by the at least one management restriction. In particular, such policies may govern the management of features of the client device that were not disabled by any of the first device management policies. As another example, the policies of the subset may comprise rules or requirements that have same or narrower scope than the rules/requirements that are set forth by the at least one management restriction. In such case, the policies of the subset may define rules that require the client device to satisfy at least the rules/requirements of the first device management policies. The policies of the subset may also require the client device to comply with one or more additional rules/requirements that are not defined by the first device management policies.

In some embodiments, prior to enrolling with the second device management service, the client device may transmit an indication of the at least one restriction to the control server associated with the second device management service. The administrator of the second device management service may then determine which policies should be issued to the particular client device. In particular, the control server associated with the second device management service may be configured to identify policies that are compatible with the at least one restriction imposed by the first device management policies. That is, the policies that the second device management service may issue may be filtered based on the at least one restriction received from the client device to identify those policies which are compatible with the first enrollment of the client device. The compatible policies may then be deployed to the client device upon enrollment of the client device with the second device management service.

In this way, those second device management policies which are compatible with (i.e. comply with) the restrictions imposed by the first (or "root") enrollment are identified by the client device. The hierarchy of device management restrictions is thus preserved. That is, enrollments of the client device that succeed the first enrollment retain the restrictions imposed by the first enrollment and possibly add further rules or requirements for the client device to observe and implement. In operation 412, the client device applies the identified subset of the one or more second device management policies on the client device.

In some embodiments, the client device may receive instructions or commands from the first device management service that relate to actions to perform in relation to the second device management service. For example, the client device may receive an instruction to terminate enrollment with the second device management service, due to expiration of allowable duration of management or policy violation. The client device may determine a priority of importance among its device management services prior to carrying out instructions/commands from a device management service. In particular, the client device may carry out instructions provided by a device management service that is higher in the enrollments hierarchy in relation to one or more device management services that are lower in the hierarchy. Upon receiving an instruction to terminate the enrollment, the client device may be unenrolled from the second device management service. The termination of the second device management service affects all device management services with which the client device subsequently enrolled. Specifically, all subsequent enrollments will be terminated as a result of the termination of the second device management service.

Figure 5:
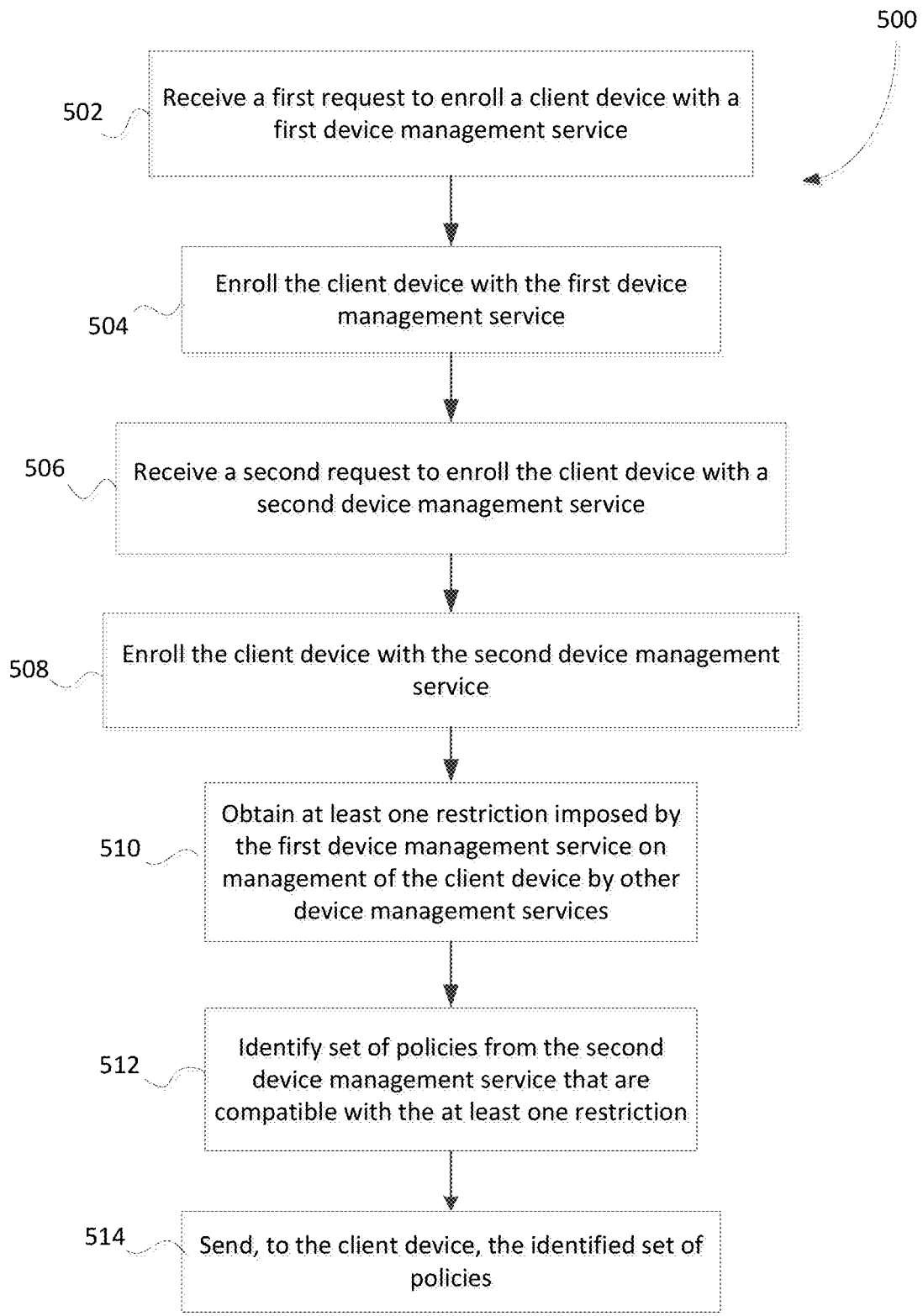
FIG. 5 shows, in flowchart form, another example method for managing enrollments of an Internet-connected device with device management services.

Reference is now made to FIG. 5, which shows in flowchart form, another example method 500 for managing enrollments of an IoT device with one or more device management services. The method 500 may be performed by a control server, such as first management server 104a of FIG. 1, which is associated with at least two different device management services.

In operation 502, the server receives, from a client device, a first request to enroll the client device with a first device management service. For example, the request may be received at an enrollment endpoint (e.g. identified by an enrollment URL) that is associated with the first device management service.

The server enrolls the client device with the first device management service, in operation 504. The server may first, either directly or via a third-party authentication service, authenticate the client device to check that the requesting device/entity is authorized for enrolling with the first device management service. In some embodiments, the server may verify that the requesting client device is included in a database containing device information for devices that are authorized for management by the first device management service. Once the client device has been authenticated, the server may register the client device with the first device management service.

In operation 506, the server receives a second request from the client device to enroll with a second device management service that is different from the first device management service. After authenticating the client device for enrolling with the second device management service, the server registers the client device with the second device management service.

In operation 510, the server accesses device management policies that are set for the first device management service, and obtains, based on the device management policies, at least one restriction imposed on management of the client device by device management services other than the first device management service. For example, the server may access a database containing policies that are defined by the first device management service and determine whether any of such policies specify restrictions on management of device features and/or settings by device management services with which the client device subsequently enrolls. As a further example, the server may receive device management policies associated with the first device management service from the client device, and store the received policies in memory of the server. The client device may transmit the device management policies to the server as part of or in addition to the second request to enroll with the second device management service. Alternatively, the server may be configured to query the client device to obtain the device management policies. As a further example, the server may receive the device management policies associated with the first device management service as input from an administrator of the first device management service, and store the received policies information in memory of the server. That is, an administrator of the first device management service may provide, as input to the server computing system, the various device management policies of set by the first device management service. The input may be received prior to, after, or at the time of enrolling the client device with the first device management service. The input has the effect of informing the child, grandchild, etc. enrollments about the device management policies affecting their scope of permitted device management operations.

In operation 512, the server identifies a set of policies from the second device management service that are compatible with the at least one restriction identified in operation 510. That is, those policies which are issued by the second device management service and which satisfy the restrictions imposed by the first device management service are identified by the server. The identified policies are then sent to the client device for implementation/application on the client device.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by an Internet-connected client device, the method comprising:
   transmitting, to a server associated with a first device management service, a request to enroll the client device with the first device management service;
   receiving, from the server associated with the first device management service, a first policy profile including one or more first device management policies, the first policy profile defining at least one restriction on management of the client device by other device management services with which the client device enrolls;
   transmitting, to a server associated with a second device management service, an indication of the at least one restriction and a request to enroll the client device with the second device management service;

receiving, from the server associated with the second device management service, a second policy profile including one or more second device management policies;

identifying a subset of the one or more second device management policies which comply with the at least one restriction; and applying the identified subset of the one or more second device management policies on the client device, wherein the at least one restriction indicates one or more features of the client device which are not manageable by the second device management service.

2. The method of claim 1, wherein the first device management service and the second device management service are implemented at different servers.

3. The method of claim 1, further comprising installing, on the client device, at least one enrollment client application for managing enrollment of the client device with one or both of the first device management service and the second device management service.

4. The method of claim 3, wherein the at least one enrollment client application comprises a first enrollment client application for managing enrollment of the client device with the first device management service and a second enrollment client application for managing enrollment of the client device with the second device management service.

5. The method of claim 1, wherein the one or more first device management policies comprise first compliance rules and wherein the at least one restriction indicates one or more rules in addition to the first compliance rules that are required to be enforced by the second device management service.

6. The method of claim 1, wherein the at least one restriction sets a limit on duration of device control by the second device management service.

7. The method of claim 1, further comprising:
receiving, from the server associated with the first device management service, an instruction to terminate enrollment with the second device management service; and
in response to receiving the instruction, terminating the enrollment with the second device management service.

8. An Internet-connected client device, comprising:
memory;
a processor coupled to the memory, the processor being configured to:
transmit, to a server associated with a first device management service, a request to enroll the client device with the first device management service;
receive, from the server associated with the first device management service, a first policy profile including one or more first device management policies, the first policy profile defining at least one restriction on management of the client device by other device management services with which the device enrolls;
transmit, to a server associated with a second device management service, an indication of the at least one restriction and a request to enroll the client device with the second device management service;
receive, from the server associated with the second device management service, a second policy profile including one or more second device management policies;
identify a subset of the one or more second device management policies which comply with the at least one restriction; and
apply the identified subset of the one or more second device management policies on the client device,
wherein the at least one restriction indicates one or more features of the client device which are not manageable by the second device management service.

9. The device of claim 8, wherein the first device management service and the second device management service are implemented at different servers.

10. The device of claim 8, wherein the processor is further configured to install, on the client device, at least one enrollment client application for managing enrollment of the client device with one or both of the first device management service and the second device management service.

11. The device of claim 10, wherein the at least one enrollment client application comprises a first enrollment client application for managing enrollment of the client device with the first device management service and a second enrollment client application for managing enrollment of the client device with the second device management service.

12. The device of claim 8, wherein the one or more first device management policies comprise first compliance rules and wherein the at least one restriction indicates one or more rules in addition to the first compliance rules that are required to be enforced by the second device management service.

13. The device of claim 8, wherein the at least one restriction sets a limit on duration of device control by the second device management service.

14. The device of claim 8, wherein the processor is further configured to:
receive, from the server associated with the first device management service, an instruction to terminate enrollment with the second device management service; and
in response to receiving the instruction, terminate the enrollment with the second device management service.

15. A non-transitory computer-readable medium containing computer-executable instructions that, when executed by a processor in an Internet-connected client device, cause the processor to:
transmit, to a server associated with a first device management service, a request to enroll the client device with the first device management service;
receive, from the server associated with the first device management service, a first policy profile including one or more first device management policies, the first policy profile defining at least one restriction on management of the client device by other device management services with which the device enrolls;
transmit, to a server associated with a second device management service, an indication of the at least one restriction and a request to enroll the client device with the second device management service;
receive, from the server associated with the second device management service, a second policy profile including one or more second device management policies;
identify a subset of the one or more second device management policies which comply with the at least one restriction; and
apply the identified subset of the one or more second device management policies on the client device,
wherein the at least one restriction indicates one or more features of the client device which are not manageable by the second device management service.

* * * * *